United States Patent
Eluvan et al.

(10) Patent No.: US 11,202,116 B2
(45) Date of Patent: *Dec. 14, 2021

(54) SYSTEMS, METHODS, AND DEVICES FOR OPTIMIZING STREAMING BITRATE BASED ON VARIATIONS IN PROCESSOR LOAD

(71) Applicant: SLING MEDIA PVT LTD, Bangaluru (IN)

(72) Inventors: Rakesh Eluvan, Bangalore (IN); Jayaprakash Ramaraj, Bangalore (IN)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,345

(22) Filed: Jun. 22, 2020

(65) Prior Publication Data

US 2020/0322666 A1    Oct. 8, 2020

Related U.S. Application Data

(63) Continuation of application No. 16/218,899, filed on Dec. 13, 2018, now Pat. No. 10,708,642.

(51) Int. Cl.
    *H04N 21/2662*    (2011.01)
    *H04N 21/845*     (2011.01)
    *H04N 21/234*     (2011.01)
    *H04L 29/06*      (2006.01)
    *G06F 9/50*       (2006.01)

(52) U.S. Cl.
    CPC ....... *H04N 21/2662* (2013.01); *H04L 65/602* (2013.01); *H04N 21/23406* (2013.01); *H04N 21/8456* (2013.01); *G06F 9/505* (2013.01)

(58) Field of Classification Search
    None
    See application file for complete search history.

(56) References Cited

U.S. PATENT DOCUMENTS

| 9,294,531  | B2 * | 3/2016  | Zhang  | H04L 65/607  |
| 9,462,032  | B2 * | 10/2016 | Lieber | H04L 65/608  |
| 10,271,345 | B2 * | 4/2019  | Wang   | H04L 65/4084 |
| 10,581,944 | B2 * | 3/2020  | Racz   | H04L 65/604  |

FOREIGN PATENT DOCUMENTS

CA    2271669 A1 *  5/2000

\* cited by examiner

*Primary Examiner* — Chikaodili E Anyikire
(74) *Attorney, Agent, or Firm* — Lorenz & Kopf, LLP

(57) ABSTRACT

Systems, methods, and devices are provided for optimizing streaming bitrate in response to variations in processor load. In various embodiments, a streaming media server includes a processor and a computer-readable storage medium, which stores computer-readable code or instructions. When executed by the processor, the computer-readable code causes the server to encode segments of a video stream at a final variable bitrate ($ABR_{FINAL}$). The encoded segments are transmitted from the server, over a network, and to a first client media receiver for presentation to an end user. The steps of encoding and transmitting are repeated during a streaming video session with the first client media receiver, while varying a value of $ABR_{FINAL}$ based, at least in part, upon a running average of a processor load placed on the processor ($LOAD_{AVG}$).

20 Claims, 2 Drawing Sheets

Figure 1:
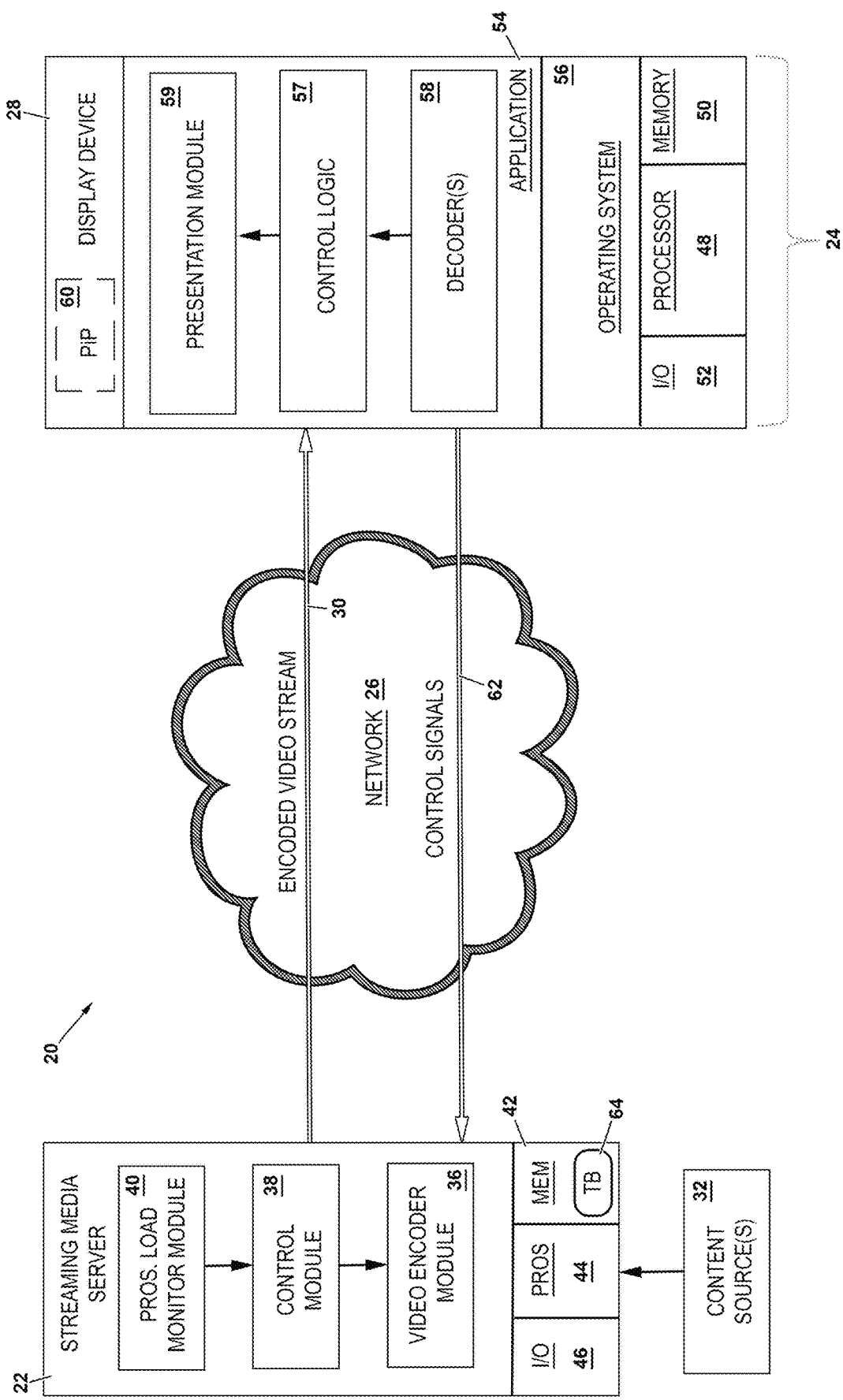

SYSTEMS, METHODS, AND DEVICES FOR OPTIMIZING STREAMING BITRATE BASED ON VARIATIONS IN PROCESSOR LOAD

CROSS-REFERENCE TO RELATED APPLICATION

This application is a continuation of the parent U.S. patent application Ser. No. 16/218,899, filed on Dec. 13, 2018, the content of which is incorporated by reference in its entirety.

TECHNICAL FIELD

The following generally relates to streaming media, and, more particularly, to systems, methods, and devices for optimizing streaming bitrate based, at least in part, on variations in processor load.

ABBREVIATIONS

The following abbreviations appear throughout this document:
ABR—Adaptive Bitrate;
CPU—Central Processing Unit;
DVR—Digital Video Recorder; and
STB—Set-Top Box.

BACKGROUND

The term "streaming video" generally refers to the reception of multimedia content, such as television programming and other audiovisual content, through a communications network at a bitrate enabling presentation of the content in real time as it is received. Streaming video may be viewed live or on-demand and transmitted by, for example, a Video On Demand (VOD) provider, a remotely-controlled placeshifting device, or a pay television provider delivering television programming via cable, satellite, or Internet (OTT) distribution channels. In the case of VOD or OTT television services, the media content may be stored in a pre-encoded format and distributed to a client media receiver, such as a mobile phone or STB, over a Content Delivery Network (CDN). Comparatively, in the case of placeshifted media, a DVR, STB, or a similar device having placeshifting capabilities and located within a user's residence may encode and transmit selected streaming video to a client media receiver, such as a mobile phone or tablet, operated by the end user.

While enhancing the ease and convenience with which end users view streaming video content, media streaming services are inherently limited by resource constraints affecting network reliability and bandwidth availability. When network bandwidth becomes overly constrained during a streaming video session, latencies may occur resulting in prolonged buffering and other delays in the presentation of streaming video content. Network latencies can also result in sluggish response times in implementing user-issued commands during a streaming video session, such as channel change commands issued by a user when streaming OTT television content.

Various ABR streaming techniques are now employed to enhance streaming performance despite variances in network bandwidth and other constraining factors. Generally, ABR techniques actively adjust encoding parameters (e.g., image resolution and video frame rate) in response to variations in network bandwidth, playback device resources, and the like. ABR techniques remain limited, however, and are often relatively slow in converging to an optimized bitrate in some instances. Additionally, existing ABR techniques typically do little to anticipate or prevent undesirably high transient processor loads or "processor hit," which can reduce the overall stability of the streaming session. Processor hit may be particularly problematic when a streaming media server, such as a consumer placeshifting device, engages in a multiclient streaming session with multiple client receivers. During such a multiclient streaming session, the server CPU may be required to perform computationally-intensive tasks related to concurrently encoding, packetizing, and transmitting separate video-containing media streams to two or more client media receivers, as well as responding to user commands received during the multiclient streaming session.

There thus exists an ongoing demand for systems, methods, and devices capable of optimizing streaming bitrate of video-containing media content in a more efficient manner, while decreasing the likelihood of undesirably high transient processor loads and other conditions reducing the stability of streaming video sessions. These and other desirable features and characteristics will become apparent from the subsequent detailed description and the appended claims, taken in conjunction with the accompanying drawings and this background section.

BRIEF SUMMARY

Systems and devices are provided for optimizing streaming bitrate in response to variations in processor load and other parameters. In embodiments, a streaming media server includes a processor and a computer-readable storage medium, which stores computer-readable code or instructions. When executed by the processor, the computer-readable code causes the server (e.g., utilizing an encoder module) to encode segments of a video stream at a final variable bitrate ($ABR_{FINAL}$). The encoded segments are transmitted from the server, over a network, and to a first client media receiver for presentation to an end user. The steps of encoding and transmitting are repeated during an ensuing streaming video session with the first client media receiver (and perhaps additional client media receivers), while the server varies a value of $ABR_{FINAL}$ based, at least in part, upon a running average of server processor load ($LOAD_{AVG}$). In certain implementations, the server may decrease the value of $ABR_{FINAL}$ when $LOAD_{AVG}$ exceeds a critical processor limit or threshold ($LOAD_{MAX}$). For example, in such implementations, the server may decrease the value of $ABR_{FINAL}$ in accordance with a stored bitrate decrease function when $LOAD_{AVG}$ exceeds $LOAD_{MAX}$; e.g., a function instructing the processor to assign a new value to $ABR_{FINAL}$ that is X percentage of a previous value of $ABR_{FINAL}$, wherein X is greater than 0 percent and less than 100 percent. In other embodiments, the server further increases the value of $ABR_{FINAL}$ when $LOAD_{AVG}$ is less than a first predetermined threshold, but greater than a second (lower) predetermined threshold. For example, in such a case, the server may increase the value of $ABR_{FINAL}$ in accordance with the predetermined bitrate increase function, which may instruct the processor to assign a new value to $ABR_{FINAL}$ that is X kilobits per second (kbps) greater than previous value of $ABR_{FINAL}$, with X ranging from about 50 kbps to about 200 kbps.

In other embodiments, the method may include the step or process of initiating a streaming video session during which the streaming media server encodes segments of a video stream at a final bitrate setting and transmits the video stream segments over a network to a first client media receiver for presentation to an end user. During the streaming video session, the streaming media server repeatedly performing the steps of: (i) estimating, at the streaming media server, a current processor load placed of the processor; and (ii) modifying the final bitrate setting at which the segments of the video stream are encoded based, at least in part, on the current processor load as compared to a maximum processor load threshold stored in the memory. In certain cases, the current processor load may be estimated as a running average utilizing a plurality of samples collected over a predetermined period of time by a processor load monitor module further included in the streaming media server. Additionally or alternatively, a buffer-based bitrate may be determined by the server based, at least in part, on a fill rate or current available capacity of the transfer buffer; with the final bitrate setting modified based on the buffer-based bitrate when the current processor load is less than a predetermined threshold stored in the memory and less than the maximum processor load threshold.

Methods are further provided for optimizing streaming bitrate in response to variations in processor load and other parameters. In various embodiments, the method includes the steps or processes of: (i) utilizing an encoder module contained in the streaming media server, encoding segments of a video stream at a final variable bitrate ($ABR_{FINAL}$); (ii) transmitting the encoded segments of the video stream from the streaming media server, over a network, and to a first client media receiver for presentation to an end user; and (iii) repeating the steps of encoding and transmitting, while varying a value of $ABR_{FINAL}$ based, at least in part, on a running average of a processor load placed on the processor ($LOAD_{AVG}$). In at least some instances, the method may also include the step or process of decreasing the value of $ABR_{FINAL}$ when $LOAD_{AVG}$ exceeds a critical processor load threshold ($LOAD_{MAX}$) stored in a memory of the streaming media server. In certain cases, the value of $ABR_{FINAL}$ may be varied based on a running average of a processor load placed on the processor ($LOAD_{AVG}$) in response to commencement of a multiclient streaming session during which the server concurrently provides encoded video streams to multiple client media receivers.

The foregoing methods and variants thereof can also be implemented through software or program products bearing computer-readable instructions. Various additional examples, aspects, and other features of embodiments of the present disclosure are described in more detail below.

BRIEF DESCRIPTION OF THE DRAWING FIGURES

Figure 2:
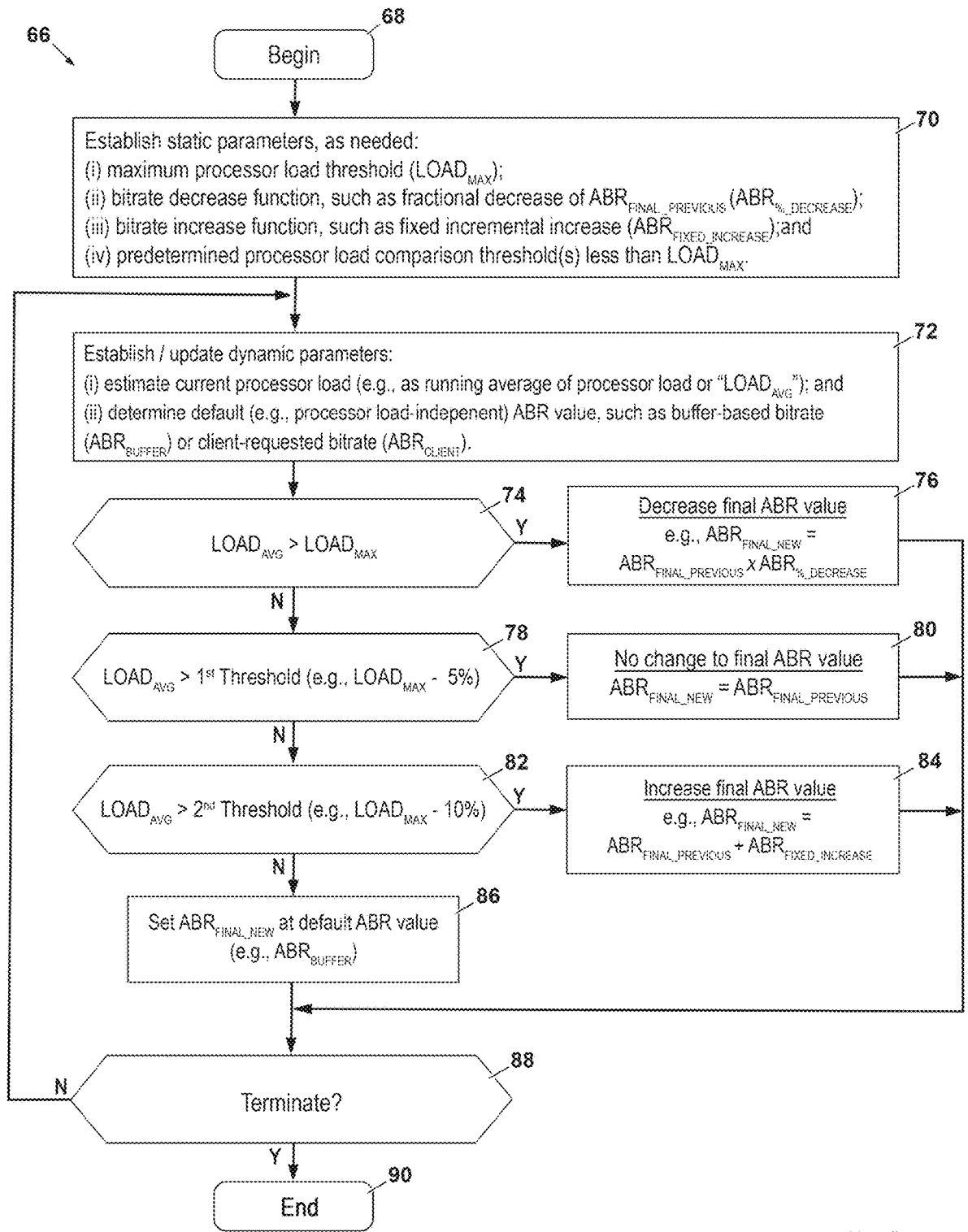

Exemplary embodiments will hereinafter be described in conjunction with the following drawing figures, wherein like numerals denote like elements, and:

FIG. 1 is a schematic of a streaming media system including a client media receiver and streaming media server, which optimizes streaming bitrate in response to variations in processor load, as illustrated in accordance with an exemplary embodiment of the present disclosure; and FIG. 2 is a flowchart of processor load-responsive bitrate modification method, which may be carried-out by the streaming media server in embodiments of the present disclosure.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Overview

Systems, methods, and devices are provided for optimizing a final bitrate value or setting (here, "$ABR_{FINAL}$") at which streaming video content is encoded by a streaming media server based, at least in part, on variations in server processor load. By virtue of the below-described methods, embodiments of the streaming media server may converge more rapidly on an optimal bitrate at which to encode segments of a video stream during a video streaming session, while further decreasing the likelihood of undesirably high transient processor loads or "processor hit" to the CPU (and/or other pertinent processing components) of the streaming media server. The overall stability of the video streaming session is consequently enhanced to provide a smooth and reliable playback experience to end users. Additionally, embodiments of the below-described method may enable the streaming media server to more effectively utilize processor resources as such resources become available. This may further enhance viewer experience by enabling the generation of higher quality (e.g., higher resolution and/or higher frame rate) streams, which may not otherwise be generated in the context of conventional ABR approaches.

In various embodiments, the streaming media server adjusts the final bitrate setting ($ABR_{FINAL}$) when needed utilizing a running average of the processor load ($LOAD_{AVG}$), as calculated from a number of samples taken over a predetermine time period. The running average of the processor load (or other processor load estimate) is then compared with a critical processor load limit ($LOAD_{MAX}$) stored in a memory of the streaming video server; and this comparison is utilized to determine whether $ABR_{FINAL}$ should be set at a new value ($ABR_{FINAL\_NEW}$) greater than, less than, or equivalent to the previous final ABR value ($ABR_{FINAL\_PREVIOUS}$). In certain embodiments, the streaming media server may further consider any number of secondary factors in determining the final encoder bitrate setting or ABR value, such as comparisons of the processor load estimate ($LOAD_{AVG}$) to a range of processor load thresholds or gradients to provide a range of responses in determining the new value for $ABR_{FINAL}$. Additionally, in certain embodiments, the streaming media server may consider other inputs, such as a bitrate value determined based upon the fill status or capacity of a transfer buffer of the streaming media server ($ABR_{BUFFER}$), when determining the new setting for $ABR_{FINAL}$. Additional description of such a processor load-responsive bitrate selection approach is set-forth below in connection with FIG. 2. First, however, a general overview of a streaming media system including a streaming media server suitable for performing various aspects of the present disclosure are described in connection with FIG. 1.

Example of a Streaming Media System Suitable for Performing Processor Load-Responsive Streaming Bitrate Optimization FIG. 1 schematically illustrates a streaming media system 20 including a streaming media server 22, which is suitable for applying the below-described processor load-responsive bitrate modification method during a streaming video session established between server 22 and at least one client media receiver 24. As depicted in FIG. 1, streaming media server 22 and, more broadly, streaming media system 20 are provided as generalized examples and should not be construed as limiting in any respect. In addition to streaming media server 22 and client media receiver 24, streaming media system 20 further includes a communications network 26 over which streaming video sessions are conducted. Communications network 26 may encompass any number of digital or other networks enabling bidirectional signal communication between server 22 and receiver 24 utilizing common protocols and signaling schemes. In this regard, communications network 26 can include one or more open CDNs, Virtual Private Networks (VPNs), Local Area Networks (LANs), Wide Area Networks (WANs), the Internet, and various other communications networks implemented in accordance with TCP/IP protocol architectures, User Datagram Protocol (UPD) architectures, or other communication protocols. In embodiments, communications network 26 may also encompass a cellular network and/or any other public or private networks.

During a given streaming video session, streaming media server 22 encodes, packetizes, and transmits streaming video content over communications network 26 to client media receiver 24. The streaming video content will typically, but need not necessarily include accompanying audio content. As the content is received, client media receiver 24 decrypts (if needed) and decodes the streaming video content (also referred to as a "video stream" or a "media stream" herein). Client media receiver 24 utilizes the newly-decoded content to generate corresponding video output signals, which are supplied to display device 28 for viewing by an end user operating receiver 24. The video output signals may be transmitted within a single electronic device or system when client media receiver 24 and display device 28 are combined as a unitary device, such as a smartphone, laptop computer, tablet computer, wearable device, or smart television (that is, a television containing an integrated receiver). Alternatively, in embodiments in which device 28 is realized as an independent electronic device separate and apart from receiver 24, such as a freestanding television set or monitor, client media receiver 24 may output the video output signals as wired or wireless transmission, which are then forwarded to display device 28.

In certain instances, streaming media server 22 may encode, packetize, and transmit a single video-containing media stream 30 during the streaming video session. In other instances, and as indicated in FIG. 1, streaming media server 22 may concurrently transmits multiple video-containing media streams as, for example, a streaming channel bundle provided pursuant to an Over-the-Top (OTT) television service. In still other instances, streaming media server 22 may concurrently provide separate video streams to multiple streaming media receivers 24; e.g., as may occur when server 22 assumes the form of a consumer placeshifting device, which provides streaming content to multiple client devices (e.g., smartphones, tablets, televisions, or the like) located within a user's residence or similar area. Regardless of the number of streaming channels or video streams provided by server 22 to receiver 24 (or receivers 24) during a given streaming video session, the streaming video content can be obtained from any number and type of content sources 32 in communication with or included within streaming media server 22. Content sources 32 can include, for example, content providers and aggregators external to streaming media server 22 and in communication with server 22 over communications network 26. Additionally or alternatively, content sources 32 can include any number and type of storage mediums accessible to streaming media server 22 (e.g., contained within or operably coupled to server 22) in which the video content subject to streaming is stored.

As appearing herein, the term "streaming media server" is defined broadly to encompass any device or group of operably-interconnected devices capable of encoding video content at an ABR value, which repeated adjusted in response to variations in processor load (and other factors) in the manner described herein. In the illustrated embodiment, specifically, streaming media server 22 includes at least one video encoder module 36, which operates under the command of at least one control module 38. Additionally, streaming media server 22 also includes a processor load monitoring module 40. While generically illustrated as a separate module in FIG. 1, processor load monitoring module 40 can be combined with control module 38 in certain implementations. Modules 36, 38, 40 can be implemented utilizing any combination of hardware and software (including firmware) components. For example, modules 36, 38, 40 may be implemented utilizing software or firmware embodied by code or computer-readable instructions residing within memory 42 and executed by at least one processor 44 (e.g., a CPU) further included in server 22. As illustrated, memory 42 generally depicts the various storage areas or mediums (computer-readable storage mediums) contained in streaming media server 22 and may encompass any number and type of discrete memory sectors. In embodiments, processor 44 may be microprocessor, which is realized along with other non-illustrated components included in server 22 as a system-on-a-chip. Finally, it will be appreciated that streaming media server 22 may contain various other components know in the art including, for example, any number and type of Input/Output (I/O) features 46 enabling bidirectional communication with client media receiver 24 and, perhaps, other nodes or devices over network 26.

Client media receiver 24 can assume various different forms including, but not limited, to that of a mobile phone, a wearable device, a tablet, a laptop computer, a desktop computer, a gaming console, a DVR, or an STB. When engaged in a video streaming session with streaming media server 22, client media receiver 24 generates video signals for presentation on display device 28. As indicated above, display device 28 can be integrated into client media receiver 24 as a unitary system or electronic device. This may be the case when receiver 24 assumes the form of a mobile phone, tablet, laptop computer, a smart television, or similar electronic device having a dedicated display screen. Alternatively, display device 28 can assume the form of an independent device, such as a freestanding monitor or television set, which is connected to client media receiver 24, such as a gaming console, DVR, STB, or other peripheral device, utilizing a wired or wireless connection. In such embodiments, the video output signals may be formatted in accordance with conventionally-known standards, such as S-video, High Definition Multimedia Interface ("HDMI"), Sony/Philips Display Interface Format ("SPDIF"), Digital Video Interface ("DVI"), or Institute of Electrical and Electronic Engineers (IEEE) 1394 standards.

By way of non-limiting illustration, client media receiver 24 is shown as containing at least one processor 48 configured to selectively execute software instructions, in conjunction with associated memory 50 and I/O features 52. I/O features 52 can include a network interface, an interface to mass storage, an interface to display device 28, and/or various types of user input interfaces. Client media receiver 24 may execute a software program or application 54 directing the hardware features of client media receiver 24 to perform the functions described herein. Application 54 suitably interfaces with processor 48, memory 50, and I/O features 52 via any conventional operating system 56 to provide such functionalities. Software application can be placeshifting application in embodiments wherein streaming media server 22 assumes the form of a STB, DVR, or similar electronic device having placeshifting capabilities and typically located within a user's residence. In some embodiments, client media receiver 24 may be implemented with special-purpose hardware or software, such as the SLING-CATCHER-brand products available from Sling Media Inc., currently headquartered in Foster City, Calif., and/or any other products.

With continued reference to FIG. 1, software application 54 suitably includes control logic 57 adapted to process user input, receive video-containing media stream 30 from streaming media server 22, decode the received media streams, and provide corresponding output signals to display device 28 in the above-described manner. Application 54 decodes video-containing content stream 30 utilizing at least one decoding module 58, which may be implemented as specialized hardware or software executing on processor 48 in certain implementations. The decoded content is supplied to presentation module 59, which generates corresponding output signals transmitted to display device 28. In embodiments, presentation module 59 may also combine decoded programming to create a blended or composite image; e.g., one or more picture-in-picture (PIP) images 60 may be superimposed over a primary image generated on display device 28.

To establish a streaming video session, streaming media server 22 receives an initial transmission from client media receiver 24 via network 26. This initial transmission may include data identifying the content desirably streamed to client media receiver 24 and other information, such as data supporting authentication of streaming media server 22 and client media receiver 24. Additionally, in embodiments wherein streaming media server 22 assumes the form of a consumer placeshifting device, such as a STB or DVR located in the residence of an end user, control commands or signals 62 may include instructions to remotely operate the placeshifting device, as appropriate. A streaming video session then ensues until termination by server 22 or receiver 24. During the streaming session, streaming media server 22 usefully determines, on a repeated or iterative basis, the ABR setting or value at which to encode streaming media content 30. This value is referred to below as the "final bitrate" or, more simply, as "$ABR_{FINAL}$." Further, as value of the final bitrate is repeated adjusted, a newly-calculated or determined value for the final bitrate is referred to below as "$ABR_{FINAL\_NEW}$," while the prior bitrate (that is, the bitrate value most recently established prior to $ABR_{FINAL\_NEW}$) is referred to below as "$ABR_{FINAL\_PREVIOUS}$."

Streaming media server 22 can select the ABR value based upon a number of factors pertaining to network performance and system resources. More recently, ABR selection schemes have been developed that select ABR values based, at least in part, on the fill rates or contents of a transfer buffer contained in a streaming media server. An example of such a transfer buffer 64 is generically shown in FIG. 1 as included in memory 42 of streaming media server 22. Generally, in such a "buffer occupancy" approach, the ABR encoding value may be increased as transfer buffer 64 begins to deplete, has greater available capacity, or the like; and decreased as buffer 64 begins to fill, has lesser available capacity, or the like. Such measurements (the available capacity and fill rate of the buffer) are generally referred to herein as "buffer occupancy parameters." Such a buffer occupancy approach may provide a convenient, readily measurable manner in which to infer network capacity and behavior. Further description of exemplary approaches for modifying ABR values based upon buffer occupancy can be found in the following reference, which is hereby incorporated by reference: U.S. Pat. No. 8,099,755 B2, entitled "SYSTEMS AND METHODS FOR CONTORLLING THE ENCODING OF A MEDIA STREAM," issued by the United States Patent and Trademark Office (USPTO) on Jan. 17, 2012.

While highly useful, the above-described buffer occupancy techniques to select streaming ABR values may fail to adequately for variations in the processor load of server 22 and, thus, may provide little, if any precautions measures against computationally-intensive surges or spikes in processing demands placed on the server processor. Consequently, undesirably high transient processor loads or processor hit to processor 44 may still occur, particularly during multiclient streaming video sessions, which may degrade the overall stability and responsiveness of the (e.g., multiclient) streaming session. Therefore, to further improve the ABR selection process in this regard, embodiments of the below-described bitrate modification method further consider processor load measurements and threshold in arriving an optimized streaming bitrate. For example, in embodiments, CPU average load analysis may be performed to identify when processor loading is undesirably high or is approaching certain upper limits; and, when this is the case, to perform certain preemptive measures (e.g., by reducing the ABR value in a controlled manner) to reduce processor load. In so doing, preemptive or remedial actions can be implemented when needed and in a highly responsive manner to further prevent or quickly resolve the placement of undesirably high processing demands on the processing architecture of the streaming media server. Exemplary methods that can be carried-out by streaming media server 22 in implementing such processor load-responsive bitrate selection schemes will now be described in conjunction with FIG. 2.

Examlary Processor Load-Responsive Bitrate Modification Scheme

FIG. 2 is a flowchart setting-forth an exemplary processor load-responsive ABR selection method 66, which may be selectively performed by streaming media server 22 (FIG. 1) in accordance with embodiments of the present disclosure. Processor load-responsive ABR selection method 66 includes a number of process steps, which are identified as STEPS 68, 70, 72, 74, 76, 78, 80, 82, 84, 86, 88, 90. Depending upon the particular manner in which processor load-responsive ABR selection method 66 is implemented, each process step generally illustrated in FIG. 2 may entail a single process or multiple sub-processes. Furthermore, the steps illustrated in FIG. 2 and described below are provided by way of non-limiting example only. In alternative embodiments of processor load-responsive ABR selection method 66, additional process steps may be performed, certain steps may be omitted, and/or the illustrated steps may be performed in alternative sequences.

Processor load-responsive ABR selection method 66 commences at STEP 68. In embodiments, ABR selection method 66 may commence automatically (that is, without requiring additional user input) at the beginning of a video streaming session. Alternatively, processor load-responsive ABR selection method 66 may commence in response to another trigger, such when available bandwidth of network 26 decreases below a certain threshold value or when the current processor load of server 22 exceeds a predetermined minimum. In still other instances, ABR selection method 66 may commence in response to other conditions, such as when two or more media receivers concurrently requests separate media streams from streaming media server 22; that is, upon initiation of a multiclient streaming session between server 22 and a plurality of client media receivers 24. This later approach may be particularly useful in avoiding or at least minimizing undesirably high processor loads during multiclient streaming sessions, which may otherwise be undesirably prone to processor overload and resulting streaming instabilities when concurrently encoding, packetizing, and transmitting multiple video streams over a period of time.

After commencing processor load-responsive ABR selection method 66, processor 44 of streaming media server 22 progresses to STEP 70 of method 66 and establishes certain static parameters utilized during subsequent method steps. Processor 44 will typically determine the static parameters by recalling such parameters from memory 42; however, it is possible for processor 44 to determine the parameters in another manner, such as by retrieving the parameters from another device or source in communication with server 22 over network 26, in certain in stances. In other embodiments, processor 44 may not determine all static parameters at a given juncture of method 66, but rather recall (or otherwise determine) the static parameters on an as-needed basis.

The static parameters utilized in the performance of method 66 will vary among embodiments. However, by way of non-limiting example and as indicated in FIG. 2, these static parameters can include one or more of the following: (i) a predetermined critical processor load limit or maximum processor load threshold ($LOAD_{MAX}$), (ii) one or more threshold processor load values less than $LOAD_{MAX}$ and utilized to provide a range of processor load-dependent responses in setting the final ABR value ($ABR_{FINAL}$) as discussed below, (iii) at least one bitrate increase function, and (iv) at least one bitrate decrease function. Addressing first the critical processor load limit ($LOAD_{MAX}$), this parameter represents a maximum load below which the load placed on processor 44 is desirably maintained. Expressed as a percentage, the value of $LOAD_{MAX}$ may range between 90% and 99% in embodiments and, perhaps, may range from about 92.5% to about 97.5% in certain instances embodiments; the term "about" as appearing denoting a disparity of less than 10% from the specified value. In other embodiments, $LOAD_{MAX}$ may be greater than or less than the aforementioned ranges. As indicated in FIG. 2, $LOAD_{MAX}$ may be assigned a static or non-varying value in embodiments. In other instances, however, the value of $LOAD_{MAX}$ may be dynamic and adjusted by processor 44 of server 22 based upon any number of factors, such as server health.

Addressing next the bitrate decrease function, this parameter defines a controlled reduction in the value of $BR_{FINAL}$ and may be applied when the average processor load ($LOAD_{AVG}$) exceeds the critical processor load limit ($LOAD_{MAX}$), as discussed below in connection with STEPS 74, 76 of method 66. In certain cases, the bitrate decrease function may set-out a fixed value by which to decrease the previously-determined value for $ABR_{FINAL}$ (herein, "$ABR_{FINAL\_PREVIOUS}$") to yield the new value or setting for $ABR_{FINAL}$. For example, in this case, the bitrate decrease function may be −X kilobits per second (kbps) by which $ABR_{FINAL\_PREVIOUS}$ is reduced to arrive at $ABR_{FINAL\_NEW}$, with X ranging from 10 to 200 kbps or, perhaps, from 50 to 150 kbps in some instances. Alternatively, and as further indicated in FIG. 2, the bitrate decrease function may be defined as a predetermined fraction or percentage of $ABR_{FINAL\_PREVIOUS}$. In this latter regard, the bitrate decrease function may be defined as X % percentage of $ABR_{FINAL\_PREVIOUS}$, where 0%<X %<100%. In such embodiments, X % may range from 50% to 95% and, perhaps, be equivalent to about 75% in certain instances. Similarly, the bitrate increase function can be defined as a fixed value, a proportional value, or another value defining an amount to increase $ABR_{FINAL\_NEW}$ relative to $ABR_{FINAL\_PREVIOUS}$ when appropriate. By way of non-limiting example, the bitrate increase function may have a fixed value of +Y kbps, with the value of Y ranging from about 25 to about 100 kbps; preferably from about 60 kbps to about 90 kpbs; and more preferably from about 70 kbps to about 80 kbps in embodiments.

At STEP 70, processor 44 may further recall from memory 42 one or more predetermined processor load thresholds less than $LOAD_{MAX}$ (herein, the "sub-max thresholds") although this is not necessary in all implementations. Generally, the predetermined sub-max threshold or thresholds recalled from memory 42 enable server 22 to provide a range of responses in setting the value of $ABR_{FINAL\_NEW}$ based upon a comparison of the current estimated processor load (in this example, the running processor load average or "$LOAD_{AVG}$") relative to the threshold or thresholds. A greater number of sub-max thresholds can be utilized, as desired, to provide increased granularity or refinement in setting the value $ABR_{FINAL\_NEW}$ based on such comparisons. Conversely, a lesser number of thresholds can be utilized to reduce the complexity of method 66 in embodiments, but with the tradeoff of increasingly coarse refinements to $ABR_{FINAL\_NEW}$. In the illustrated example, specifically, two such sub-max threshold are employed during the course of ABR selection method 66 and recalled during STEP 72: a first (lower) sub-max threshold and a second (higher) sub-max threshold. In embodiments, the second sub-max threshold value may at least 50% greater, if not at least twice the first sub-max threshold value. However, in other implementations, the relative value of the first and second sub-max thresholds may vary, a different number of sub-max thresholds may be utilized, or no sub-max thresholds may be utilized when conducting method 66 such that STES 78, 80, 82, 84 may be omitted.

As recalled by processor 44 at STEP 70 of processor load-responsive ABR selection method 66, the sub-max threshold or thresholds may be assigned fixed or variable values. Further, the sub-max threshold(s) and may be defined independently or based upon the value of another parameter, such as $LOAD_{MAX}$ itself. In the illustrated example, specifically, the first sub-max threshold may be defined as $LOAD_{MAX}$ minus a lower percentage value, while the second sub-max threshold may be defined as $LOAD_{MAX}$ minus a higher percentage value. In this case, the lower percentage value range from about 2.5% to about 7.5% and, perhaps, may be equivalent to about 5%; while the higher percentage value may range from about 7.5% to about 20% (while being greater than the lower percentage value) and, perhaps, may be equivalent to about 10% in at least some instances.

Next, at STEP 72 of processor load-responsive ABR selection method 66, streaming media server 22 estimates a current estimated processor load of processor 44 along with any number of additional pertinent parameters, which vary dynamically over time. In the illustrated example, two dynamic parameters are determined on an iterative or repeated basis during performance of method 66: a current estimated load of server processor 44 and a default (e.g., processor load-independent) ABR value. Addressing first the current processor load of server processor 44, this parameter is usefully calculated as a running average of processor load; although the possibly that an instantaneous estimate of processor load may be utilized in embodiments is not precluded. In one approach, processor load monitor module 40 collects a predetermined number of processor load samples (e.g., a minimum of 20 samples) over a predetermined time period or sliding time window having a predetermined duration; e.g., on the order of about 500 milliseconds. Processor load monitoring module 40 then utilizes the plurality of processor load samples to calculate the current processor load as a running average ($LOAD_{AVG}$), which is then forwarded to processor 44 as an input. Alternatively, processor 44 may perform this calculation itself utilizing samples provided by module 40 and stored in memory 42.

Addressing the default or baseline ABR value, this value may be calculated independently of the server processor load and, thus, reverted to when the processor load is sufficient low as to warrant little concern. See STEP 86 below. The default ABR value may be client-requested bitrate ($ABR_{CLIENT}$) in certain embodiments, noting that a client device (e.g., client media receiver 24 shown in FIG. 1), or multiple client devices engaged in a multiclient streaming session with server 22, will typically request streaming content at a maximum quality level (resolution and framerate) and therefore at a maximum bitrate. Streaming media server 22 may thus safely accommodate such requests in instances in which the load place don processor 44 is relatively lower. Accordingly, in embodiments in which $ABR_{CLIENT}$ is utilized as the default ABR value, the value of $ABR_{CLIENT}$ may be set at the requested bitrate transmitted from client media receiver 24, over network 26, and to streaming media server 22. In other embodiments, a different default value may be utilized, such as a buffer-based ABR value ($ABR_{BUFFER}$) determined utilizing a buffer occupancy approach of the type described herein; that is, the buffer-based ABR value may be determined based upon buffer fill rate, available buffer capacity, and/or other such buffer occupancy parameters. In this latter case, and as indicated in FIG. 2, $ABR_{BUFFER}$ may be calculated by processor 44 or another component of streaming media server 22 based upon the contents and/or fill rate of transfer buffer 64.

Advancing to STEP 74 of processor load-responsive ABR selection method 66, processor 44 of streaming media server 22 next compares the current running average of the processor load ($LOAD_{AVG}$) to the predetermined critical processor load limit ($LOAD_{MAX}$) recalled from memory 42. If the current running average of the processor load ($LOAD_{AVG}$) exceeds the critical processor load limit ($LOAD_{MAX}$), processor 44 progresses to STEP 76 and decreases the value of the final bitrate ($ABR_{FINAL}$) to reduce the undesirably high processor load. Specifically, at STEP 76, processor 44 may assign a new value to the final bitrate ($ABR_{FINAL\_NEW}$), which is decreased relative to the previous value of the final bitrate ($ABR_{FINAL\_PREVIOUS}$) in accordance with the bitrate decrease function recalled at STEP 70. Thus, in accordance with the previously-introduced example, and as indicated in STEP 76, processor 44 sets the new value of $ABR_{FINAL}$ ($ABR_{FINAL\_NEW}$) as equal to the previous value of $ABR_{FINAL}$ ($ABR_{FINAL\_PREVIOUS}$) multi-plied by $ABR_{\%\_DECREASE}$, as recalled from memory 42 during STEP 72 of method 66. By way of example, $ABR_{\%\_DECREASE}$ may be equal to about 75% in certain instances.

In further implementations of processor load-responsive ABR selection method 66, processor 44 may reduce the value of $ABR_{FINAL\_NEW}$ in another manner during STEP 76, such as by subtracting a set value (e.g., x kbps) from the previous $ABR_{FINAL}$ setting. Afterwards, processor 44 continues to STEP 88 of method 66 and determines whether the current iteration of method 66 should terminate; e.g., due to termination of the streaming media session. If determining that the current iteration of method 66 should terminate, processor 44 performs those actions appropriate to terminate method 66 (STEP 90). Otherwise, processor 44 returns to STEP 72 of method 66 and the above-described process step repeat.

If instead determining that $LOAD_{AVG}$ does not exceed $LOAD_{MAX}$ at STEP 74 of method 66, processor 44 of streaming media server 22 advances to STEP 78. At STEP 78, processor 44 compares the running average of the processor load ($LOAD_{AVG}$) to the critical processor load limit ($LOAD_{MAX}$) to the first or higher sub-max threshold, which may have a value of about $LOAD_{MAX}$–5% in an embodiment. If determining that the running average of the processor load ($LOAD_{AVG}$) exceeds the higher sub-max (STEP 78), processor 44 of streaming media server 22 determines that no change to the current $ABR_{FINAL}$ value is warranted in the illustrated example. Accordingly, processor 44 progresses to STEP 80 of method 66 and sets $ABR_{FINAL\_NEW}$ at its previous value ($ABR_{FINAL\_PREVIOUS}$); or, in essence, takes no action to modify the value of $ABR_{FINAL}$. Processor 44 then continues onward to STEP 88 and determines whether to terminate the current iteration of ABR selection method 66, as previously discussed. In other embodiments, processor 44 may adjust the new value of $ABR_{FINAL}$ differently at STEP 80, such as by decreasing the value of $ABR_{FINAL\_NEW}$ relative to $ABR_{FINAL\_PREVIOUS}$ by a set amount less than (e.g., approximately half) that defined by the bitrate decrease function. If instead determining that the running average of the processor load ($LOAD_{AVG}$) does not exceed the higher sub-max threshold, processor 44 proceeds to STEP 82 and performs a similar comparison utilizing the lower sub-max threshold, as discussed below.

If, at STEP 82, it is determined that running average of the processor load ($LOAD_{AVG}$) exceeds the second or lower sub-max threshold, processor 44 advances to STEP 84 and increases the new setting of $ABR_{FINAL\_NEW}$ by a controlled amount relative to $ABR_{FINAL\_PREVIOUS}$. For example, processor 44 may set $ABR_{FINAL\_NEW}$ at a value equivalent to the sum of $ABR_{FINAL\_PREVIOUS}$ and $ABR_{FIXED\_INCREASE}$. Again, $ABR_{FIXED\_INCREASE}$ may represent a predetermined or fixed value recalled from memory 42 on the order of, for example, 25 to 100 kbps. In other embodiments, the predetermined increase may be a percentage-based increase or a fixed value increase having a value greater than or less than the aforementioned range.

If instead determining that running average of the processor load ($LOAD_{AVG}$) does not exceed the lower sub-max threshold, processor 44 of streaming media server 22 advances to STEP 86 and reverts to the default ABR setting. For example, as indicated in FIG. 2, processor 44 may set the value of $ABR_{FINAL\_NEW}$ as equivalent to $ABR_{BUFFER}$, again noting that the value of $ABR_{BUFFER}$ may be calculated based upon the fill rate or present capacity of transfer buffer 64 shown in FIG. 1. In other instances, processor 44 may set $ABR_{FINAL\_NEW}$ as equivalent to a different default ABR value, such as the client-requested bitrate ($ABR_{CLIENT}$), or may blend such approaches to determine the value of $ABR_{FINAL\_NEW}$. In effect, then, processor load-responsive ABR selection method 66 may be insert higher level logic upstream other bitrate streaming logic (e.g., that utilized to calculate $ABR_{BUFFER}$) to better regulate system stability by performing certain actions (in particular, bitrate adjustments) as processor loads peak or climb during a given single client or multiclient streaming video session.

Following STEP 84 or STEP 86, processor 44 again progresses to STEP 88 and determines whether the current iteration of method 66 is appropriately terminated. If determining termination is appropriate, processor 44 terminates the current iteration of method 66 (STEP 90). Otherwise, processor 44 returns to STEP 72 and the above-described processing steps repeat or loop to repeatedly adjust the new $ABR_{FINAL}$ setting ($ABR_{FINAL\_NEW}$) in view of processor load. The newly-determined $ABR_{FINAL}$ ($ABR_{FINAL\_NEW}$) setting is then provided to video encoder module 36, which duly encodes additional segments of video stream 30 in accordance with the newly-determined $ABR_{FINAL}$ setting.

In the above-described manner, processor 44 repeatedly calculates final ABR value ($ABR_{FINAL}$) at which to encode additional segments of the video-containing media stream (video stream 30 in FIG. 1) on an iterative basis, while tracking or monitoring processor load and adjusting $ABR_{FINAL}$ to maintain processor health within a desired range. In so doing, processor load-responsive ABR selection method 66 adjusts ABR settings in a highly responsive manner as processor loads vary and peak during a given single client or multiclient streaming video session to improve streaming stability. Additionally, in certain implementations, processor 44 may increase the value of $ABR_{FINAL}$ (that is, allow for higher bitrate stream segments having higher resolutions, higher frame rates, and the like) in instances in which the lower level logic would prohibit or prevent such increases. This, in turn, allows processor 44 of streaming media server 22 to more effectively utilize processor and network resources, thereby improving the overall viewing experience of the end user.

Conclusion

Systems, methods, and devices have been provided for optimizing streaming bitrate based on variations in processor load. Embodiments of the above-described streaming media server modify the final bitrate setting (that is, the bitrate at which segments of a video stream are encoded) in view of a measure or estimate of processor load (e.g., a running average of a processor load), taken in conjunction with a predetermined critical processor load limit and possibly other factors as appropriate. In so doing, the above-described systems, methods, and devices enable a higher degree of responsiveness to variations or trends in processor load, while preventing or at least minimizing the likelihood of excessive processor loading or hit. This, in turn, may increase the stability of video streaming sessions, particularly multiclient streaming sessions, to improve the viewing experience of the end user(s). Additionally, embodiments of the below-described method may enable the streaming media server to more effectively utilize processor resources and thereby enhance stream quality in at least some instances.

Embodiments of the above-described method are carried-out by a streaming media server during the course of a video streaming session in which server encodes, packetizes, and transmits a video-containing media stream over a network and to at least one client device or "client media receiver." The streaming media server encodes segments of a video stream at a final ABR encoding setting or value ($ABR_{FINAL}$) and transmits the video stream segments over a network to a client media receiver. While conducting the streaming video session, the streaming media server repeatedly performs the steps or functions of: (i) monitoring, at the streaming media server, a running average of a processor load of the streaming media server ($LOAD_{AVG}$); and (ii) modifying the final bitrate setting ($ABR_{FINAL}$) in response to variations in the running average of the processor load ($LOAD_{AVG}$) as compared to a predetermined critical processor load limit ($LOAD_{MAX}$), as recalled from a memory contained in the streaming media server. In certain embodiments in which the memory of the server further contains a transfer buffer, the method may also include the step or process of determining, at the streaming media server, a buffer-based bitrate ($ABR_{BUFFER}$) utilizing the transfer buffer.

The term "exemplary" is used herein to represent one example, instance or illustration that may have any number of alternates. Any implementation described herein as "exemplary" should not be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A streaming media server, comprising:
    a processor; and
    a computer-readable storage medium storing computer-readable code that, when executed by the processor, causes the streaming media server to perform operations of:
    encoding segments of a video stream at a final variable bitrate ($ABR_{FINAL}$);
    decreasing a value of $ABR_{FINAL}$ by a predetermined bitrate decrease function when a running average of a process load ($LOAD_{AVG}$) exceeds a critical load limit ($LOAD_{MAX}$) incrementally, by a controlled reduction to decrease the value of $ABR_{FINAL}$;
    transmitting encoded segments over a network and to a first client media receiver for presentation to an end user; and
    repeating the steps of encoding and transmitting during a streaming video session with the first client media receiver, while reducing the value of $ABR_{FINAL}$ so long as $LOAD_{AVG}$ exceeds $LOAD_{MAX}$.

2. The streaming media server of claim 1, further comprising:
    a computer-readable storage medium storing a critical processor load threshold ($LOAD_{MAX}$); and
    wherein, when the computer-readable code is executed by the processor, the streaming media server further performs the operation by the predetermined bitrate decrease function to set-out a fixed value by which to decrease a previously-determined value for $ABR_{FINAL}$ to a value of a $ABR_{FINAL\_PREVIOUS}$ assigned for the $ABR_{FINAL}$.

3. The streaming media server of claim 2, further comprising:
    the computer-readable storage medium storing the predetermined bitrate decrease function; and wherein, when the computer-readable code is executed by the processor, the streaming media server further performs the operation of decreasing the previously-determined value for the $ABR_{FINAL\_PREVIOUS}$ to yield a new value decreasing the value of $ABR_{FINAL}$ when $LOAD_{AVG}$ exceeds $LOAD_{MAX}$.

4. The streaming media server of claim 3 wherein the predetermined bitrate decrease function instructs the processor to assign the new value to the $ABR_{FINAL}$ that is X percentage of a previous the previously-determined value of assigned to the $ABR_{FINAL\_PREVIOUS}$;

wherein X is greater than 0 percent and less than 100 percent.

5. The streaming media server of claim 4 wherein the predetermined bitrate decrease function instructs the processor to assign the new value to the $ABR_{FINAL}$, which is decreased relative to the previously-determined previous value of $ABR_{FINAL\_PREVIOUS}$.

6. The streaming media server of claim 5 further comprising:

in response to a determination that the running average of the processor load ($LOAD_{AVG}$) exceeds a first predetermined threshold, then warranting no change is necessary of value to of the $ABR_{FINAL}$ and setting the value of the $ABR_{FINAL}$ at the previously-determined previous value of the $ABR_{FINAL\_PREVIOUS}$.

7. The streaming media server of claim 6 further comprising:

in response to the determination that the running average of the processor load ($LOAD_{AVG}$) exceeds a second threshold, then increasing the value of $ABR_{FINAL}$ by a controlled amount in accordance with the previously-determined value of the $ABR_{FINAL\_PREVIOUS}$.

8. The streaming media server of claim 7 further comprising:

storing the first predetermined threshold less than $LOAD_{MAX}$; and storing a second predetermined threshold less than $LOAD_{MAX}$ and less than the first predetermined threshold; and wherein, when the computer-readable code is executed by the processor, the streaming media server further performs the operation of increasing the value of $ABR_{FINAL}$ when $LOAD_{AVG}$ is less than the first predetermined threshold, but greater than the second predetermined threshold.

9. The streaming media server of claim 8 wherein the assigned new value to the $ABR_{FINAL}$ is X kilobits per second (kbps) greater than the previously-determined previous value of the $ABR_{FINAL}$;

wherein X is greater than 50 kbps and less than 200 kbps.

10. A method performed by a streaming media server containing a processor and a memory, the method comprising:

initiating a streaming video session during which the streaming media server encodes segments of a video stream at a final bitrate setting of a value ($ABR_{FINAL}$) and transmits a set of video stream segments over a network to a first client media receiver for presentation to an end user; and during the streaming video session, repeatedly performing the steps of:

estimating, at the streaming media server, a current processor load placed of the processor; and changing the final bitrate setting to the value of the $ABR_{FINAL}$ at which the segments of the video stream are encoded by a predetermined bitrate function by incremental controlled amounts based on the current processor load as compared to a maximum processor load threshold stored in the memory.

11. The method of claim 10, further comprising:

decreasing the value of $ABR_{FINAL}$ by a predetermined bitrate decrease function when a running average of a process load ($LOAD_{AVG}$) exceeds a critical load limit ($LOAD_{MAX}$) incrementally, by a controlled reduction to decrease the value of $ABR_{FINAL}$.

12. The method of claim 11, further comprising:

performing an operation by the predetermined bitrate decrease function to set-out a fixed value by which to decrease a previously-determined value for $ABR_{FINAL}$ to a value of ($ABR_{FINAL\_PREVIOUS}$) assigned to for the value of the $ABR_{FINAL}$.

13. The method of claim 12, further comprising:

estimating the current processor load as a running average utilizing a plurality of samples collected over a predetermined period of time by a processor load monitor module further included in the streaming media server.

14. The method of claim 13 wherein the memory contains a transfer buffer, and wherein the method further comprises:

determining, at the streaming media server, a buffer-based bitrate based on available capacity of the transfer buffer.

15. The method of claim 14 wherein the memory contains a transfer buffer, and wherein the method further comprises:

modifying the $ABR_{FINAL}$ at which the segments of the video stream are encoded further based on the buffer-based bitrate when the current processor load is less than a predetermined threshold.

16. A method performed utilizing a streaming media server, the method comprising:

utilizing an encoder module contained in the streaming media server, encoding segments of a video stream at a final variable bitrate of value ($ABR_{FINAL}$);

transmitting encoded segments of the video stream from the streaming media server, over a network, and to a first client media receiver for presentation to an end user; and repeating the steps of encoding and transmitting, while varying a value of $ABR_{FINAL}$ by a predetermined bitrate decrease function when a running average of a process load ($LOAD_{AVG}$) exceeds a critical load limit ($LOAD_{MAX}$) incrementally, by a controlled reduction to decrease the value of $ABR_{FINAL}$.

17. The method of claim 16 further comprising decreasing a previously-determined value for $ABR_{FINAL\_PREVIOUS}$ to yield a new value decreasing the value of $ABR_{FINAL}$ when $LOAD_{AVG}$ exceeds $LOAD_{MAX}$ stored in a memory of the streaming media server.

18. The method of claim 17 wherein the streaming media server further comprises the memory storing a first predetermined threshold less than $LOAD_{MAX}$ and a second predetermined threshold less than the first predetermined threshold; and wherein the method further comprises in response to a determination that the running average of the processor load ($LOAD_{AVG}$) exceeds the first predetermined threshold, then warranting no change is necessary to the value of the $ABR_{FINAL}$ and setting of the value assigned to the $ABR_{FINAL}$ at a previous value of $ABR_{FINAL\_PREVIOUS}$.

19. The method of claim 18 wherein the streaming media server further comprises the memory storing a predetermined threshold less than $LOAD_{MAX}$; and
    in response to the determination that the running average of the processor load ($LOAD_{AVG}$) exceeds a second threshold, then increasing the value of the $ABR_{FINAL}$ by a controlled amount in accordance with the previous value of $ABR_{FINAL\_PREVIOUS}$.

20. The method of claim 19 further comprising:
    determining a default value for the $ABR_{FINAL}$ based upon a fill rate of a transfer buffer contained in the streaming media server.

\* \* \* \* \*